Nov. 30, 1943.    G. INNES    2,335,764
GRAIN HARVESTING MACHINE
Filed Dec. 11, 1942

INVENTOR.
GEORGE INNES
BY
Merrill M. Blackburn
ATTORNEY

Patented Nov. 30, 1943

2,335,764

UNITED STATES PATENT OFFICE 2,335,764

GRAIN HARVESTING MACHINE

George Innes, Davenport, Iowa

Application December 11, 1942, Serial No. 468,873

4 Claims. (Cl. 56—1)

The present invention relates to grain harvesting machinery and more particularly to grain spreaders for combines. In this specification and the accompanying claims, the term "grain" is used in a broad sense and not merely as designating food grains but it includes also flax, beans, grasses and other vegetation which may be cut and threshed to recover the seeds.

Among the objects of this invention are the provision of mechanism for use in connection with combines which is designed to receive a windrow from a pick-up and spread it out approximately evenly across the width of the machine so that it will be in a layer of substantially even thickness when engaged by the cylinder of the combine; the provision of improved means for the purpose indicated; and such further objects, advantages, and capabilities as will hereinafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Figure 1:
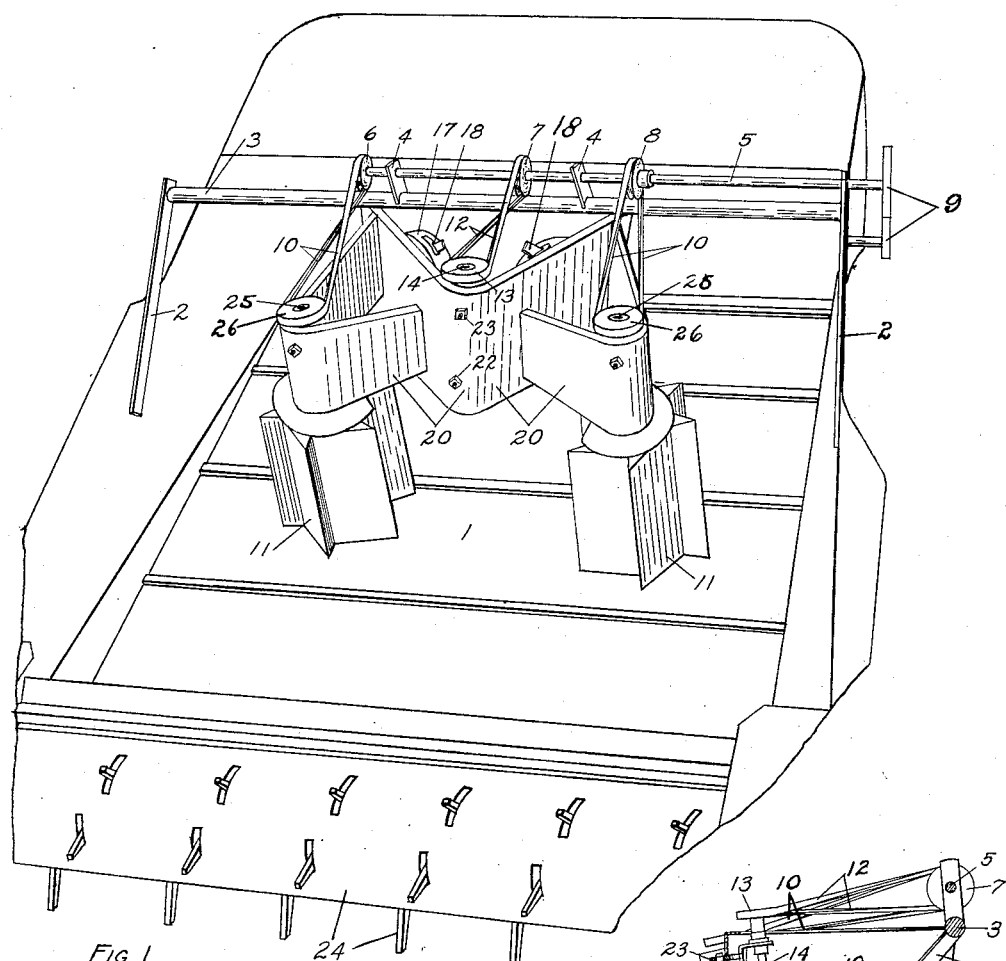
Fig. 1 represents a perspective view of a structure embodying my present invention, the grain elevating platform being indicated as partly broken away and partly by dot-and-dash lines, the purpose being to indicate the relative position of this platform and the present attachment.

Reference will now be made in greater detail to the annexed drawing for a more complete description of this invention. The elevating platform 1 of the combine has side walls to which are secured brackets 2 between which is a supporting bar or tube 3 designed to support the mechanism of the present invention. From the bar 3 rise supporting posts 4 which receive and support the shaft 5. Mounted on this shaft and secured thereto are pulleys 6, 7, and 8 which are utilized for the driving of the operating mechanism of this invention. A gear train 9, getting its power from a suitable part of the machine, drives the shaft 5 and this, through a plurality of belts 10, drives the slingers 11 which are utilized to center the grain on the conveyor belt or apron driven upwardly on the elevating platform 1.

The belt pulley 7, through a belt 12, drives the pulley 13, carried by the shaft 14, which shaft carries other pulleys 15, about which are reeved the belts 16. These belts 16 are utilized in rotating the spreaders 17 provided with a plurality of retractile fingers 18. These fingers may be mounted on an eccentric axis in the casing of each spreader unit 17 or may be journaled on eccentrics mounted on the axes of the units 17, or otherwise mounted to produce the in-and-out motion desired for the purpose of tearing the windrow apart after it is centrally delivered by the slingers 11. Brackets 19 suitably support the units 17 an appropriate distance above the elevating platform.

Figure 2:
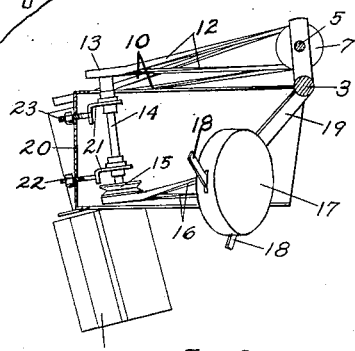
Fig. 2 represents an approximately central section through the structure shown in Fig. 3.
Figure 3:
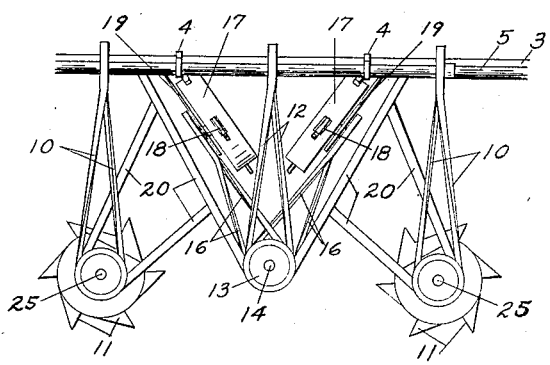
Fig. 3 is a plan view of the structure shown in Figs. 1 and 2.

A sheet metal guard and support 20, preferably formed from one or more pieces of sheet metal, serves as a support for the slingers 11 and the shaft 14, the latter of which has brackets 21, by means of which the shaft bearings are suitably held with relation to the guide plates, as shown in Fig. 2. Bolts 22 and 23 extend forwardly from the brackets 21 and serve as means whereby the tension of the belts 12 and 16 may be adjusted. If the belt 12 needs adjusting, this is done by adjusting the nut on the bolt 23 and, if it is needful to adjust the belts 16, this is done by adjusting the nut on the bolt 22.

As now built, a combine is normally provided at its front end with a pick-up, the position of which is indicated at 24. This pick-up may be varied in length but a common length therefor is five feet. When moving the combine through the field, it is not always possible to have the windrow come exactly in the middle of the pick-up. Therefore, it is the purpose of the present invention to receive the windrow as carried by the apron from the pick-up and move it to the center of the apron between the slingers 11 which are rotated at a speed sufficient to insure that the grain will be forced to the mid-position on the apron and will therefore pass in between and below the spreaders 17. These spreaders rotate at such a speed that the fingers 18 take hold of the grain as it moves along with the apron and tear it apart, spreading it over the entire width of the apron so that it will be fed to the threshing cylinder, substantially evenly, throughout its length.

The shafts 25, by which the slingers 11 are carried, have pulleys 26, secured to their upper ends and these are connected to the belt pulleys 6 and 8 by the belts 10. Thus, the main drive shaft 5 drives not only the spreaders 17 but also the centering slingers 11 which, as indicated above, are supported above the apron by the sheet metal support 20, flanged at its upper edge, and, if desired, at its lower edge, for the sake of giving rigidity thereto. Naturally, the spreaders 17 must be driven at such a speed that part of the grain will be spread out approximately to the sides of the apron, part will be permitted to pass up the mid-portion thereof, and part spread out over intermediate portions thereof.

It is believed that it will be apparent from the foregoing description and the annexed drawing that I have provided a mechanism which will accomplish the desired objects more effectively than they can be accomplished by any prior structure. While I have disclosed herein what is now regarded as the preferred embodiment of this invention, I do not desire to be limited to the precise details of construction disclosed herein other than as required by the annexed claims.

Having now described my invention, I claim:

1. In a combine having threshing mechanism, a pick-up, and a conveyor belt for conveying grain to be threshed from the pick-up to the threshing mechanism; the combination of rotary means, located above and in proximity to the belt for centering on the conveyor belt the grain as it comes from the pick-up, rotary means, located above the belt and beyond the first rotary means in the direction of travel of the belt, for tearing the grain apart and spreading it over the width of the conveyor belt, and drive means, connected in driving relation to the centering and spreading means, for rotating them.

2. In a combine having threshing mechanism, a pick-up for picking up a windrow of grain from the ground, and a conveyor belt for conveying grain from the pick-up to the threshing mechanism; the combination of a pair of rough surfaced rotary members supported above the upper surface of the belt with their axes of rotation approximately perpendicular thereto and rotating upon said axes, drive means operatively connected to said rotary members for rotating them to cause grain approaching them to be centered on the belt, and rotary means above said belt, between said members and the threshing mechanism to cause spreading of the grain substantially evenly over the surface of the belt.

3. In a combine having a pick-up, threshing mechanism, and a feeding belt to carry unthreshed grain from the pick-up to the threshing mechanism; the combination of a support extending transversely of the belt and rigidly supported above the same, supporting means secured thereto and held spaced thereby upwardly from the belt, slingers supported by said supporting means on opposite sides of the longitudinal center of the belt and above the same, spreading mechanism between the slingers and the threshing mechanism for receiving the grain from the slingers and spreading it laterally substantially evenly over approximately the entire width of the belt so that the grain will be fed to the threshing mechanism at a substantially uniform rate throughout the length of the threshing mechanism, and driving means for driving said slingers and said spreading means.

4. In a combine having threshing mechanism, a pick-up, and a conveyor for carrying grain from the pick-up to the threshing mechanism; the combination of an elongated support extending transversely of the conveyor and spaced upwardly therefrom, a V-shaped metal support secured to the first mentioned support with the open side of the V directed toward the threshing mechanism and the angle of the V directed toward the pick-up, said V-shaped support being spaced upwardly from the conveyor to provide a passageway for the grain between the conveyor and the support, other sheet metal supports secured to the first mentioned sheet metal support and held rigidly thereby spaced upwardly from the conveyor, grain-centering means carried by the second mentioned sheet metal supports and spaced upwardly from the conveyor, said centering means being rotated in a direction approximately parallel to the upper surface of the conveyor, spreading means carried by the first mentioned support and rotating in directions making an angle of seventy degrees (70°) to ninety degrees (90°) with each other and approximately perpendicular to the conveyor, the centering means serving to direct the grain below and between the spreading means, and mechanism for rotating the centering means and the spreading means whereby to cause the centering means to direct the grain to the spreading means and to cause the spreading means to spread the grain over the conveyor.

GEORGE INNES.